A. W. WARSEN.
CLUTCH.
APPLICATION FILED DEC. 9, 1914.
1,170,372.
Patented Feb. 1, 1916.
2 SHEETS—SHEET 2.
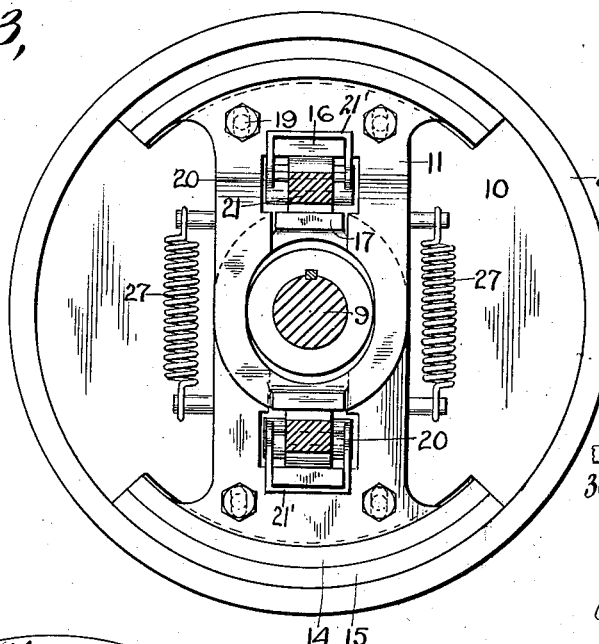
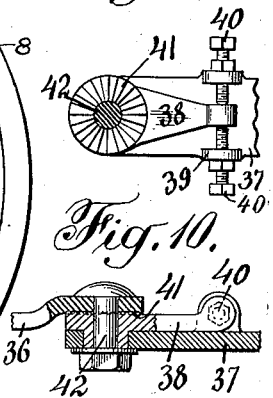
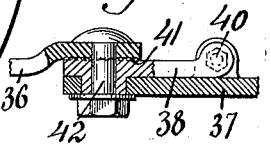
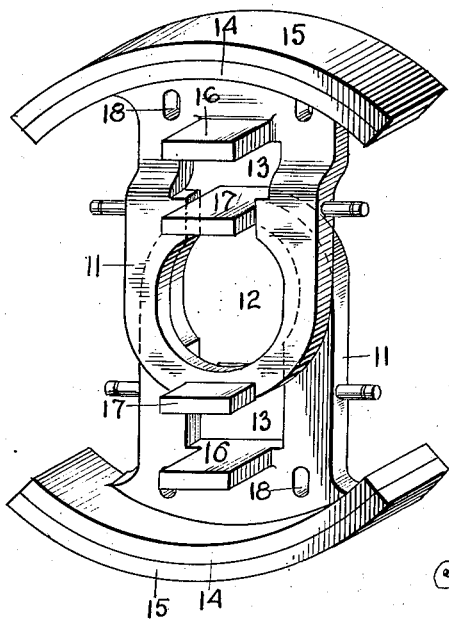
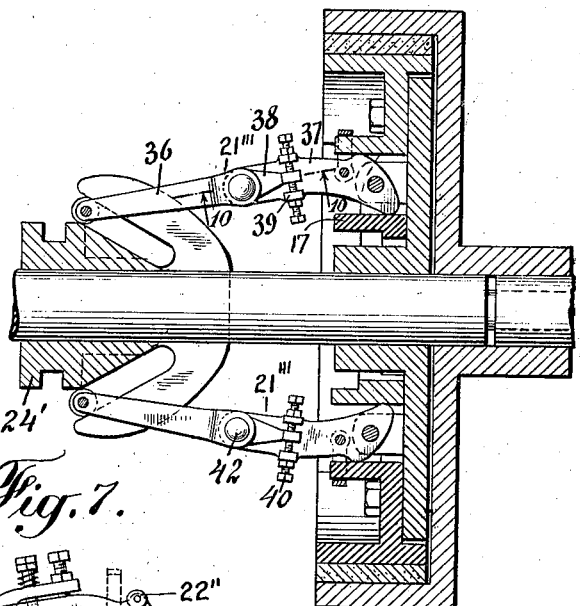
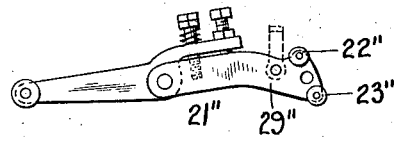
WITNESSES
INVENTOR
August W. Warsen
BY
ATTORNEYS

UNITED STATES PATENT OFFICE.

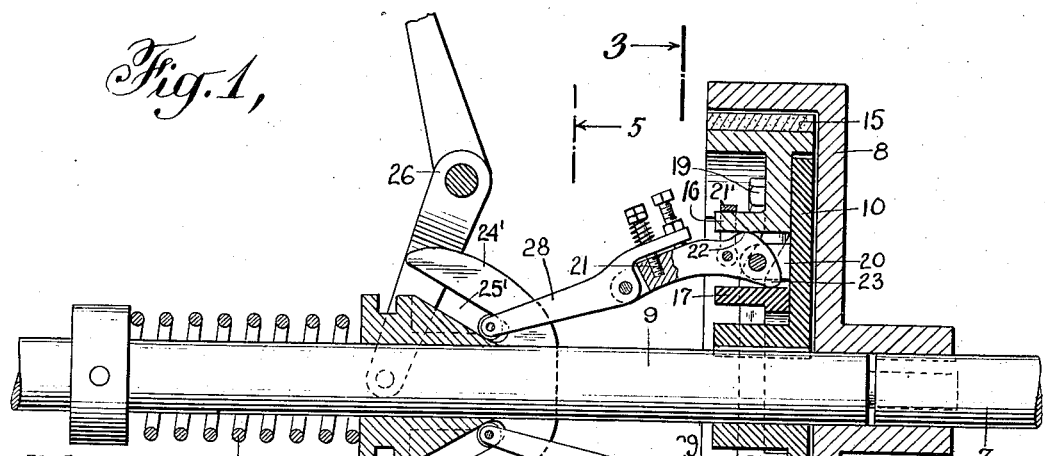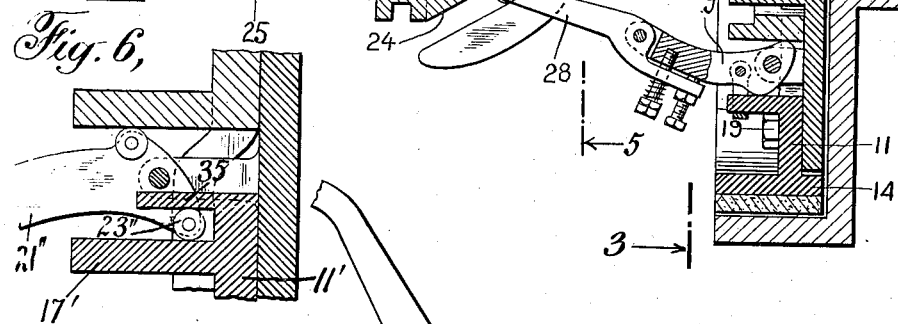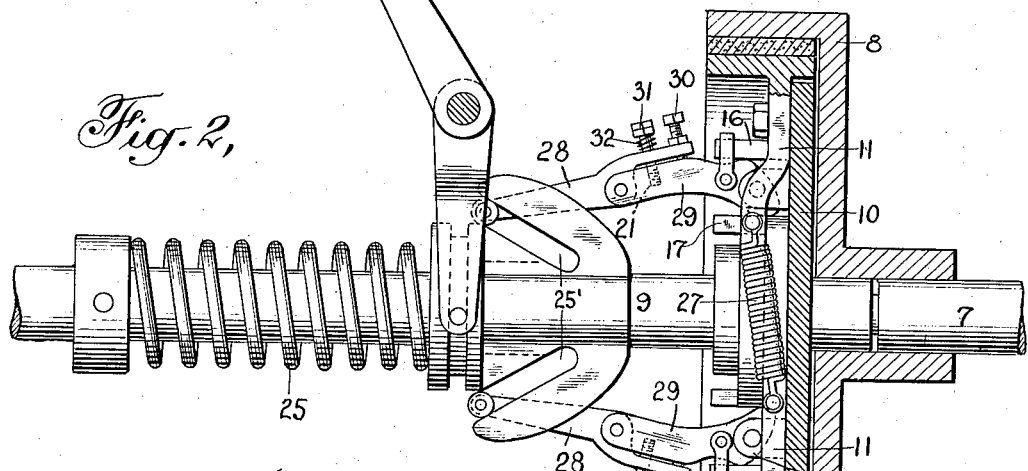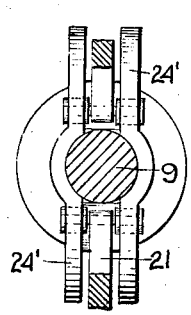

AUGUST W. WARSEN, OF NEW YORK, N. Y.

CLUTCH.

1,170,372.   Specification of Letters Patent.   Patented Feb. 1, 1916.

Application filed December 9, 1914. Serial No. 876,269.

*To all whom it may concern:*

Be it known that I, AUGUST W. WARSEN, a citizen of the United States, and a resident of the city of New York, borough of Brooklyn, in the county of Kings and State of New York, have invented a new and Improved Clutch, of which the following is a full, clear, and exact description.

My invention relates to power transmission means, and has reference more particularly to means for coupling a driving and a driven member.

An object of the invention is to provide a simple, strong, efficient and inexpensive clutch which is characterized by spreading fingers adapted to double the pressure on the friction surfaces.

With the above and other objects in view, the nature of which will more fully appear as the description proceeds, the invention consists in the novel construction, combination and arrangement of parts as herein fully described, illustrated and claimed.

In the accompanying drawings, forming part of the application, similar characters of reference indicate corresponding parts in all the views, and Figure 1 is a longitudinal section through an embodiment of my invention showing the driving and driven members uncoupled; Fig. 2 is a similar section showing the driving and the driven members coupled, some of the details of the mechanism being shown in elevation; Fig. 3 is a transverse section on line 3—3, Fig. 1; Fig. 4 is a perspective view of the jaws; Fig. 5 is a cross section on line 5—5, Fig. 1; Fig. 6 is a modified structure of the friction jaw; Fig. 7 is a modified structure of a spreading finger; Fig. 8 is a longitudinal section of a clutch showing a modified structure of spreading fingers; and Figs. 9 and 10 are details of the fingers shown in Fig. 8.

Referring to the drawings, 7 represents the driving or engine shaft, to which is secured a clutch member 8 in the shape of a shallow cylindrical dish the inner surface of which is the frictional surface of the said clutch member. Alining with the driving shaft 7 is the driven shaft 9 bearing partly in the clutch member 8 and in the driving shaft 7. Secured to the driven shaft 9 is a disk 10 which is in close proximity to the bottom of the clutch member 8. Mounted to slide rigidly on the disk 10 are jaws 11 each having an elongated central opening 12 adapted to engage the hub of the disk 10 and an extension 13 of said opening 12, said extension being directed radially toward the circular flange 14 of the jaw which carries the friction material 15, the engagement of which material with the member 8 couples the driving and the driven shafts. Each of the jaws adjacent the extension 13 is provided with a lateral flange 16 and also with a second lateral flange 17 located at the opposite end of the jaw, the flanges 16 and 17 being in alinement and central with the circular flange and openings of the jaws. The flanges 16 of one jaw face the flanges 17 of the other jaw when they are secured to the disk 10.

To guide the jaws 11 in a radial direction, each of the jaws is provided with a pair of elongated slots 18 which are engaged by screws 19 threaded into the disk 10. The disk 10 is provided with pairs of lugs 20 protruding through the extension 13 of the opening in the jaws and located between the flanges 16 and 17 of the jaws. Bearing with one end in each pair of lugs is a spreading finger 21 having cam portions 22 and 23 in contact with the flanges 16 and 17 respectively. The other end of each finger 21 is engaged between wings 24' of a collar 24 which collar is mounted to slide on the driven shaft 9, the said end of each of the fingers having rollers engaging the passage 25' formed in the side of the wings. A resilient member 25 is mounted to co-act with the collar 24 and normally tends to force the same into engagement with the fingers 21 and swing said fingers in their bearings on the lugs 20, consequently causing a simultaneous spreading of the jaws 11, thus clutching the driven and the driving shafts. The cam portions 22 and 23 of the fingers are so related to their pivot that the displacement of said fingers by the cone causes substantially the same radial displacement of the two jaws by each finger. Consequently, if one of the fingers is out of action by some cause, the other finger will operate the two jaws and couple the driving and the driven shafts. Each of the fingers is provided with a yoke 21' straddling the adjacent flange 16, whereby the jaw is bound to participate in the returning movement of the finger. The movement of the collar 24 is controlled by a suitable lever 26. The contact between the flanges 16 and 17 of the jaws and the cam portions 22 and 23 of the fingers is retained by the yokes 21' and also by resilient members 27 normally tending to move the jaws radially away from the lateral surface of the clutch member 8. It will be noted that the engagement of the cam portions 22 and 23 of each finger with the flanges of the jaw relieves all stress from the bearing of the finger in the lug 20. The result is that each jaw is under pressure of the two fingers, consequently, a double pressure results, causing a better surface friction of the parts of the clutch.

To take up any play that may be formed due to the wear of the fingers and the collar, the fingers are formed of two hinged parts 28 and 29. The part 28 is free to move toward the driven member 9 but limited to move on its pivot in the opposite direction by an adjusting screw 30 carried in the extension of said member 28. A screw 31 is carried in the portion 29 of the finger and projects through the extension of the portion 28. On this screw a resilient member 32 is provided which normally brings the adjusting screw 30 against the portion 29. By means of the adjusting screw 30 any wear can be taken up.

Fig. 6 shows the jaw 11' adjacent the flange 17' provided with a secondary flange 35 extending parallelly to the flange 17' and serving to eliminate the use of yoke 21', as the finger 21'' has its cam surface 22'' and 23'' formed by rollers (see Fig. 7), of which roller 23'' is engaged between the flange 17' and the secondary flange 35; consequently, the retracting movement of the fingers when the clutch is released will cause a radial movement of the jaw 11' toward the axis of the clutch. It is self-evident that spreading fingers with cam surfaces formed of rollers 22'' and 23'', as shown in Fig. 7, may be used in connection with a clutch as shown in Figs. 1, 2 and 8, that is to say, using the yoke 21' for the retracting movement of the jaws, and it is so shown in Fig. 7.

In Figs. 8, 9 and 10 a further modification of the spreading fingers is shown. The fingers 21''' consists of three pieces, 36, 37 and 38. The part 37 which has the cam surface engaging the flanges of the friction jaw is also provided with a pair of lugs 39 adapted to receive adjustable screws 40 and between which is located the part 38 bearing in the part 37. One face of said member 38 is serrated, as shown at 41, and is engaged by the serrated surface of the part 36 which engages the collar 25'. A bolt 42 binds the three parts of the finger together. By means of the serrated surface and the bolt 42 a large adjustment in the finger can be made, while by means of the adjusting screws 40 any slight wear in the cam surfaces of the fingers can be easily taken up.

Although the disclosure shows two jaws 11, a larger number can be provided, particularly when the size of the clutch is large.

It may be said that the frictional clutch member on the driven member is formed of segments, mounted to move radially, with means for moving said segments radially to engage the frictional clutch member connected to the driving member.

From the foregoing description, taken in connection with the accompanying drawings, the advantage of the construction and operation of the clutch shown will be readily understood by those skilled in the art to which the invention pertains, and while I have described the operation, together with the contrivance which I now consider to be the best embodiment thereof, I desire to have it understood that the clutch shown is merely illustrative and that such changes may be made when desired as are within the scope of the appended claims.

Having thus described my invention, I claim as new and desire to secure by Letters Patent:

1. In a clutch, a friction member, a disk therein, a pair of diametrically opposite jaws mounted to move radially on said disk, means carried by said jaws adapted to engage the friction member, resilient means for moving the jaws toward the axis, spreading fingers bearing on the disk, each of said jaws having means for engaging each finger, and means for moving said fingers on their bearing, whereby said jaws are moved radially away from the axis of the disk and caused to engage the first friction member.

2. In a friction clutch, spreader fingers comprising two hinged portions, one of said portions having an extension, an adjusting screw in said extension engaging the other portion of the finger, a screw in said other portion projecting through the extension, and a resilient member on said screw forcing said extension toward said other portion.

3. In a clutch, a friction member, a disk therein, friction jaws mounted to slide radially on said disk, said jaws having flanged portions on opposite sides of the disk's axis, spreading fingers bearing on said disk and each having cam portions in engagement with said flange portions of the jaws on the same side of the disk's axis, and means for moving said spreading fingers on their bearings, whereby said jaws are actuated substantially as and for the purpose set forth.

4. In a clutch, a friction member, a disk therein, a pair of diametrically opposite jaws mounted to move radially on said disk, friction material carried by said jaws and adapted to engage the friction member flanges on each jaw on opposite sides of the disk's axis, a pair of spreading fingers bearing on said disk, each having cam portions adjacent its bearing in engagement with a flange on each jaw located on the same side of the disk's axis, means for moving said spreading fingers on their bearings whereby said jaws are simultaneously operated by each finger, and resilient means connecting said jaws and normally tending to move them radially away from the friction member.

5. In a clutch, a friction member, a disk therein, friction jaws mounted to slide radially on said disks, said jaws having flanged portions, spreading fingers bearing on said disk and having cam portions in engagement with said flange portions of the jaws, a yoke connecting each finger with the flanged portion of the jaw, and means for moving said spreading fingers on their bearings substantially as and for the purpose set forth.

6. In a clutch, a friction member, a disk therein, a pair of diametrically opposite jaws mounted to move radially on said disk, friction material carried by said jaws and adapted to engage the friction member, flanges on each jaw, a pair of spreading fingers bearing on said disk, each of said fingers having cam portions adjacent its bearing in engagement with a flange of each jaw, a yoke on the finger adjacent its bearing in engagement with the flange of the jaw, and means for moving said spreading fingers on their bearings substantially as and for the purpose set forth.

7. In a clutch, a friction member, a disk therein, jaws mounted to move radially on said disk, spreading fingers carried by said disk and engaging said jaws, a yoke connecting each of the fingers with a jaw whereby the jaws are retracted by the movement of said fingers, and means for actuating said fingers.

8. In a clutch, a friction member, a disk therein, a pair of diametrically opposite jaws mounted to move radially on said disk to engage the friction member, a pair of spreading fingers carried by said disk, each in engagement with both jaws and whereby both jaws are adapted to be independently moved by each finger, and means actuating said fingers.

In testimony whereof I have signed my name to this specification in the presence of two subscribing witnesses.

AUGUST W. WARSEN.

Witnesses:
B. JOFFE,
PHILIP D. ROLLHAUS.